Figure 1:
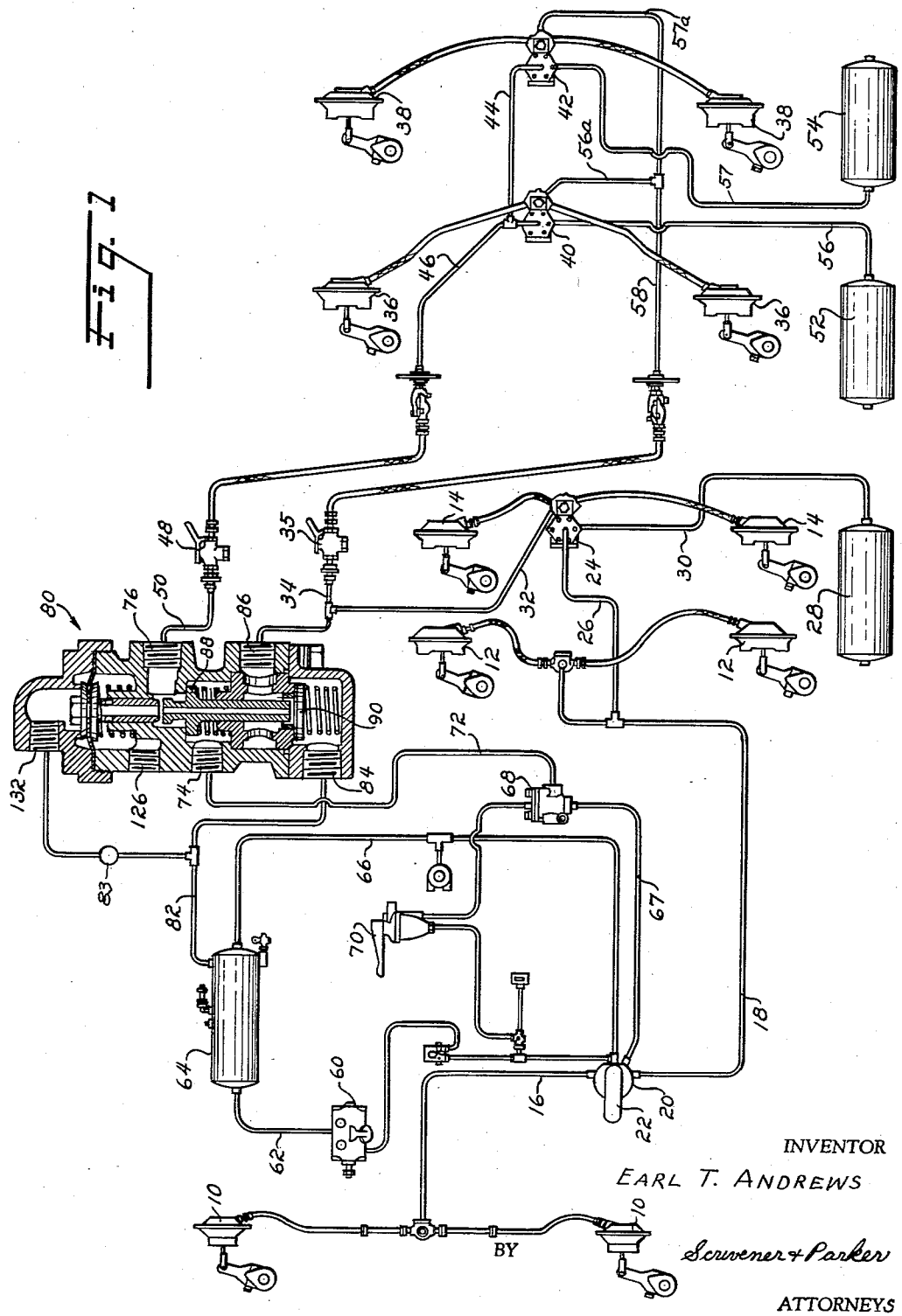

Sept. 2, 1958  E. T. ANDREWS  2,850,330
FLUID PRESSURE BRAKE MECHANISM
Filed Sept. 21, 1956  2 Sheets-Sheet 1

INVENTOR
EARL T. ANDREWS
BY
Scrivener & Parker
ATTORNEYS 2,850,330
Patented Sept. 2, 1958

2,850,330

FLUID PRESSURE BRAKE MECHANISM

Earl T. Andrews, Elyria, Ohio, assignor to Bendix-Westinghouse Automotive Air Brake Company, Elyria, Ohio, a corporation of Delaware Application September 21, 1956, Serial No. 611,173

7 Claims. (Cl. 303—84)

This invention relates to fluid pressure braking systems for tractor-trailer vehicles and more particularly to an arrangement for conserving fluid pressure on the tractor for braking operations, and for automatically applying the vehicle brakes notwithstanding the occurrence of a break or leak in various of the brake lines on the vehicles, or a separation of the vehicles, in service.

In the conventional fluid pressure braking systems for tractor-trailer vehicles, the tractor and trailer brake systems have been so connected that the trailer reservoir is always in communication with the tractor reservoir through an emergency line in order that the former may be constantly charged with fluid pressure. An emergency valve on the trailer functions to automatically apply the trailer brakes upon a severe leak in the emergency line, usually caused by the trailer breaking away from the tractor. When such a condition occurs, the fluid pressure in the tractor reservoir is rapidly depleted through the broken line, thus causing great difficulty in applying the tractor brakes. Severe leakage or rupture of other lines on the vehicles may likewise bleed the source of fluid pressure on the tractor to such an extent as to result in braking pressures which are insufficient for effective braking. Accordingly, to conserve tractor reservoir pressure under the emergency conditions alluded to, tractor protection valves have been provided to close off automatically the service and emergency lines on the tractor when the tractor pressure has fallen to a predetermined low value. While the prior valves have afforded protection for the vehicle train under various leakage conditions they do not provide full and complete braking protection for the vehicles and it is accordingly an object of the present invention to provide a tractor protection valve for a vehicle train which is an improvement over the prior valves of this type and which shuts off the tractor emergency and service lines and positively exhausts the trailer service and emergency lines regardless of where a serious leak occurs in the tractor and/or trailer braking systems.

Another object of the invention is to provide an improved protection valve and an improved tractor and trailer braking system which positively, upon decrease of tractor pressure to a predetermined low value, causes automatic setting of the brakes on all axles of the tractor and of the trailer which are equipped with emergency valves responsive to decrease in emergency line pressure.

A more specific object of the invention is the provision of a tractor protection valve which, upon the decrease of tractor pressure from any cause to a predetermined low value, will automatically interrupt communication between the tractor and trailer emergency and service lines and will positively in each case exhaust the trailer emergency line to insure positive instantaneous operation of relay emergency valves controlled thereby.

A still further object comprehends the provision of a relatively simple construction for accomplishing the foregoing and one which may be readily installed in existing systems and without interference with the normal operation of the brakes on the two vehicles.

Figure 2:
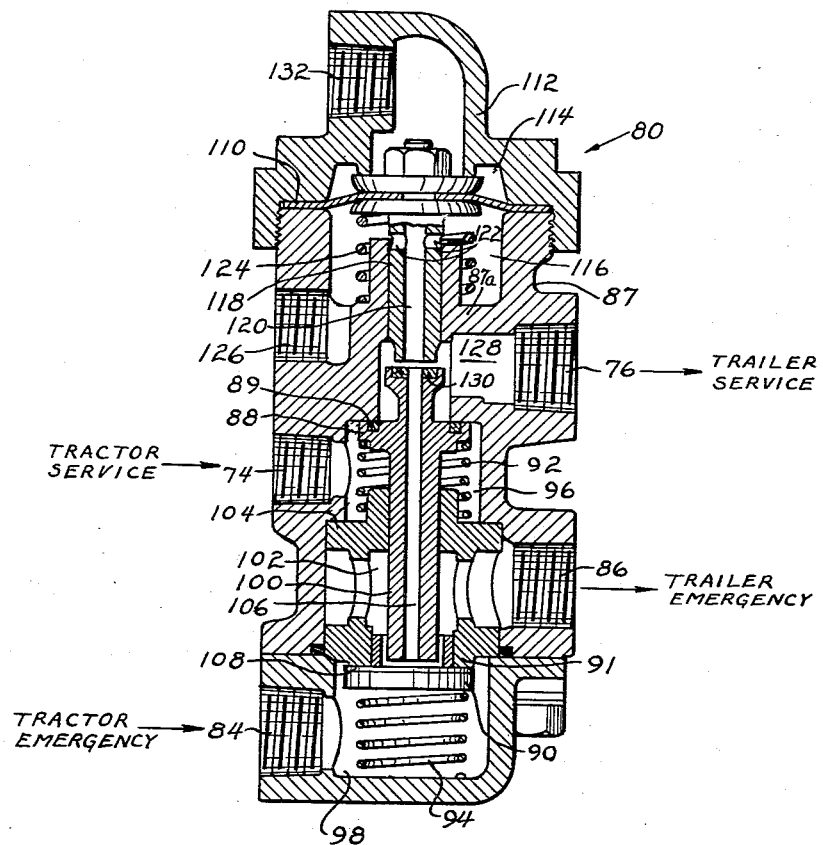

Other objects and novel features will become apparent of the invention when taken in connection with accompanying drawings wherein:

Fig. 1 is a diagrammatic illustration of a tractor-trailer braking system for vehicles equipped with dual rear axles; and Fig. 2 is an enlarged detail view of a protection valve utilized in the system of Fig. 1 and constructed in accordance with the invention.

As shown, the present invention is utilized in connection with a tractor-trailer braking system of a well-known air pressure operated type. The tractor system illustrated is for use on a tractor having a front axle and two parallel rear axles. The front wheels are provided with brake chambers 10 and the wheels on the rear axles are provided with similar chambers 12 and 14. The chambers 10 and 12 are interconnected by service conduits 16 and 18 through the usual brake valve 20 controlled by a pedal 22. The chambers 14 on the rearmost axle of the tractor are controlled through the medium of a relay emergency valve 24, of well-known construction, which receives service pressure through a conduit 26 connected to the conduit 18. Emergency air is supplied to the usual emergency reservoir 28 through the relay emergency valve 24, by way of conduits 30, 32 which communicate with a trailer emergency line 34 leading to the usual cutout cock 35 at the rear of the tractor.

The trailer braking system illustrated is for use on a semi-trailer equipped with a pair of parallel axles having wheels provided with brake chambers 36 and 38 which are controlled respectively through the medium of relay emergency valves 40 and 42, similar to the relay emergency valve 24. These valves receive service pressure through interconnected service conduits 44, 46 leading forwardly to the front end of the trailer where the latter is connected through a usual cutout cock 48 with a corresponding tractor service line 50. Each of the trailer relay emergency valves 40, 42 is provided respectively with an emergency reservoir 52, 54 supplied with fluid pressure through conduits 56, 57 which are connected through the relay emergency valves with interconnected emergency conduits 56–a, 57–a, and 58, the latter of which leads forwardly for connection to the cutout cock 35.

Fluid pressure for the system so far described is supplied by the usual tractor carried compressor 60 which is connected by a conduit 62 to a main reservoir 64 on the tractor. A conduit 66 supplies service pressure from the reservoir 64 to the brake valve 20 and leading from the latter is a conduit 67 which may be connected through a conventional double check valve 68 (selectively controlled by either the pedal 22 or a hand operated lever 70 in the usual manner) to a conduit 72 which is connected to the aforedescribed trailer service line 50 through ports 74 and 76 of a tractor protection valve device 80 constructed in accordance with the present invention and hereinafter described in detail. Connected also to the reservoir 64 is an emergency conduit 82 which is connected through ports 84 and 86 of the protection valve 80 with the previously described emergency conduit 34.

As shown generally in Fig. 1 and in detail in Fig. 2, the tractor protection valve 80 of the present invention comprises a body 87 containing check valves 88 and 90 which are respectively positioned in the tractor service and emergency lines between the aforementioned ports 74, 76 and 84, 86. The check valves 88 and 90 are arranged to be closed against valve seats 89 and 91 by springs 92 and 94 in the direction of air flow and the valves are positioned in respective inlet chambers 96 and 98 which are respectively connected to the tractor service inlet port 74 and the emergency inlet port 84. The spring 92 positions the service check valve 88 in the chamber 96 and normally urges the valve to a position against the seat 89 to interrupt communication between the service inlet port 74 and the outlet port 76. The emergency check valve 90, located in the lower end of the body, is positioned by its spring 94 in the chamber 98 and the action of the spring is such as to tend to close the valve 90 in the direction of air flow to interrupt communication between emergency conduits 82 and 34. When valve 90 is opened by a stem 100, integral with the service check valve 88, conduits 82 and 34 are connected by way of inlet port 84 and chamber 98, the latter communicating with the outlet port 86 by way of bore 102 formed in a spool member 104. The latter member is preferably provided with a seal, not shown, which engages the outer surface of the stem 100.

The stem 100, integral with service check valve 88, is provided with an axial bore 106 which is adapted to be sealingly closed against a seating surface 108 atop the emergency valve 90 when the latter is opened by the downward movement of the stem 100. However, in the no-air position of Fig. 2 with the check valves in their closed positions, a clearance is provided between the lower end of stem 100 and the upper surface of the valve 90 so as to connect bore 102 and emergency outlet port 86 with the bore 106, for exhausting to atmosphere, in a manner to become apparent, any emergency pressure in emergency line 34 connected with the tractor and trailer.

Means are provided for controlling the operation of the check valves 88 and 90 in accordance with variations in tractor reservoir pressure and in the form shown, such means includes a diapharm 110 which is clamped between the body 87 and a cap 112 and which forms a diaphragm chamber 114 and an exhaust chamber 116, respectively positioned above and beneath the diaphragm 110 at the upper portion of the valve member 80. A valve actuating element 118 is secured to the diaphragm 110 and is formed with a bore 120 which communicates with the exhaust chamber 116 through a plurality of openings 122. With the parts in the no-air position shown, a diaphragm spring 124 is effective to move the diaphragm 110 and element 118 upwardly to connect the trailer service line 50 with an atmospheric port 126 by way of outlet 76, a chamber 128, bore 120, openings 122 and the exhaust chamber 116. Under these conditions check valves 90 and 88 are closed and hence emergency line 34 is connected to atmosphere by way of bore 106 in stem 100, chamber 128 and the same path just described for exhausting the service line. When the diaphragm 110 is moved downwardly against the action of spring 124, the atmospheric connection of the service line is cut off as the lower end of element 118 engages an exhaust valve seat 130 carried by the service check valve 88. It will be observed from Fig. 2 that the construction is such that communication between the service line and atmosphere is first disrupted while the emergency line 34 is still vented to atmosphere through the aligned bores 106 and 120. It will be noted that chambers 116 and 128 are separated by body portion 87–a and preferably, such body portion includes a seal, not shown, which engages the outer surface of the element 118.

With the arrangement just described, continued downward movement of diaphragm 110 and element 118 effects an opening of service check valve 88 against its spring 92 to restore communication between the tractor service and trailer service conduits 72 and 50. Thereafter, as the stem 100 is moved downwardly with service check valve 88, it engages seat 108 of the emergency check valve 90, as before described, and disrupts communication between atmosphere and the trailer emergency line 34. Continued downward movement of the diaphragm 110 causes opening of the emergency check valve 90 against its spring 94 restoring communication between emergency conduits 82 and 34.

It should be noted at this point that the tractor emergency line 32 connected to the relay emergency valve 24 is connected into the tractor system on the trailer side of the tractor protection valve 80. Thus it could be properly said that, in effect, the tractor carried emergency conduit 32 forms a portion of the trailer emergency braking system and hereinafter this conduit will be considered from the operational standpoint as a part of the trailer emergency system.

Referring again to the protecton valve 80, in order to control the action of the diaphragm 110, the diaphragm chamber 114 is directly connected to the tractor reservoir by way of a port 132 and the conduit 82 as shown in Fig. 1. With the diaphragm in chamber 114 directly connected to the tractor reservoir it will be apparent that variation of pressure in the latter will directly control diaphragm movement.

In operation, and assuming that the parts occupy the position illustrated, with no air in the system, it will be seen that the emergency and service valves 90 and 88 are closed and that both the trailer emergency and service lines 34 and 50 are connected with the atmospheric port 126. As the air pressure is built up in the tractor reservoir 64, through operation of the compressor 60, the parts of the valve 80 remain in the position shown until sufficient pressure has been built up in the reservoir and consequently chamber 114 to move the diaphragm 110 against the upward force of its spring 124. In practice, a pressure of approximately 20 p. s. i. is required to initiate downward movement of the diaphragm. At approximately 25 p. s. i. the lower end of element 118 contacts seat 130 on the service check valve 88 disrupting communication between the trailer service line 50 and the exhaust cavity 116 beneath the diaphragm. Further increase of pressure to approximately 32 p. s. i. unseats the service check valve 88 as above explained and thereafter the bore 106 in stem 100 is closed by engagement of the lower end thereof with the seat 108 of the emergency check valve 90. This action disrupts further communication of the trailer emergency line with atmosphere. At approximately 50 p. s. i. the emergency check valve 90 is unseated to restore normal communication between the tractor and trailer emergency and service lines thereby enabling pressure in the trailer emergency reservoirs 28, 52, and 54 to build up and otherwise placing the tractor and trailer systems in condition for normal operation. As long as the pressure in the tractor reservoir remains above a predetermined pressure, which is less than the opening pressure of 50 p. s. i., the check valves 88 and 90 remain open and normal brake operation is available on both vehicles. It will be apparent that the cut-in pressure will exceed the cut-out pressure, i. e., the pressure at which the check valves close, because during pressure build-up, before the valves are opened, tractor emergency pressure builds up in the chamber 98 beneath the emergency check valve 90 so that this produces an additional force over that of the springs which must be overcome before the valve can be opened. After the emergency check valve is opened the pressures on the top and bottom thereof are equalized so that no additional closing pressure is afforded by the pressure in chamber 98. Hence the pressure at which the valves close must fall to something less than that at which they open and in practice this pressure differential has amounted to approximately 15 p. s. i. with opening pressure being about 50 p. s. i. and closing pressure being about 35 p. s. i.

With the valves opened as above explained, normal brake operation is available on both vehicles in the usual manner. In the event, however, of leakage from the tractor reservoir, due to any broken line on either vehicle, of such an extent to cause the pressure in the tractor reservoir to drop to the predetermined low cut-out pressure of, say, 35 p. s. i., the diaphragm 110 commences moving upwardly. For purposes of illustration, let it be assumed that a severe leak develops in the trailer service line 46 and the operator opens the brake valve 20 for a sustained period of time. Under these conditions, pressure from tractor reservoir 64 flows through the brake valve 20, the protection valve 80, and to atmosphere through the leak in the trailer service line. Thus pressure in the tractor reservoir and hence in the tractor and trailer emergency lines 82 and 34 is rapidly and simultaneously depleted until it reaches approximately 35 p. s. i. At this point the diaphragm spring 124 has commenced to move the diaphragm 110 upwardly and after slight initial movement, the emergency check valve 90 is seated through the action of its spring 94 and immediately thereafter the end of stem 100 is withdrawn from seat 108 to connect the trailer emergency line 34 to atmosphere by way of port 86, bore 106, exhaust chamber 116 and port 126. At this instant the service check valve 88 is still open and the trailer service line is thus not yet communicated with atmosphere. However, as soon as bore 106 is connected with the trailer emergency line the pressure in the emergency line surges up through bore 106 and bore 120 to beneath the diaphragm 110 to rapidly move this upwardly with a snap action. Simultaneously the service check valve 88 is moved to closed position by its spring 92 and element 118 moves off its seat 130 to connect the trailer service line with atmosphere as previously described.

From the above description it should be carefully noted that the emergency check valve 90 is closed and the trailer emergency line is vented to atmosphere before the service check valve is closed. Thus with the valve of the present invention, it would be impossible to isolate a leak in the trailer service line before the trailer emergency line is vented to atmosphere.

It will be understood, that during the above-described operation, as soon as the trailer emergency line is vented to atmosphere, the relay emergency valves 24, 40 and 42 on the tractor and trailer move to emergency position to apply the tractor brakes, controlled by brake chambers 14, and to apply the trailer brakes, controlled by the brake chambers 36 and 38. If desired, the relay emergency valves may be provided with suitable chokes so that the application of the tractor and trailer brakes in emergency may not be too sudden or severe and result in a controlled stop.

From the foregoing, it will also be understood that upon the closure of the service check valve 88, the tractor and trailer braking systems are isolated from each other and about 35 p. s. i. is trapped in the tractor system which is available for braking purposes to supplement the braking effect of the relay emergency valves.

With reference to the system illustrated in Fig. 1, it will be noted that the tractor protection valve of the invention permits venting of all emergency lines whether they control relay emergency valves on the tractor or on the trailer. This is accomplished by connecting all tractor carried relay emergency lines into the trailer emergency line on the trailer side of the tractor protection valve. Thus regardless of where leaks occur on any vehicle of the tractor-trailer train all axles equipped with relay emergency valves will have their brakes automatically set. Such an arragement enables efficient braking of the tractor in the event of a break-in-two of the coupled vehicles or in the event of a ruptured brake line.

If desired, a manually operable two-way control valve 83 may be inserted in conduit 82, see Fig. 1, for the purpose of exercising a further control of the novel braking system of the invention. Such valve is of conventional construction and arranged so that in a normal position, compressed air flows from the reservoir 64 to the valve 80, while in an emergency position, such flow is interrupted and the port 132 of the valve 80 is connected to atmosphere. Thus when valve 83 is placed in the normal position, the system functions as heretofore described. However, when the valve 83 is placed in emergency position, which vents the cavity 114 of the valve 80 to atmosphere, the parts of the valve 80 move to the positions shown in Fig. 2 to vent the trailer emergency lines 32, 34 to atmosphere. When this occurs, the relay emergency valves 24, 40 and 42 move to emergency position to apply the vehicle brakes controlled by the brake chambers 14, 36 and 38 as previously described. Hence, the operator may cause a manual emergency operation of the braking system by merely moving the valve 83 to the emergency position.

In certain instances, it may be desirable to increase the snap action of the protection valve 80 and this may be readily effected by inserting a governor valve of the type shown at 124 in the patent to E. R. Fitch et al. No. 2,645,308 dated July 14, 1953, in the conduit 82 between the valve 83 and the port 132. In such event, the governor valve may be set to supply pressure to the port 132 when the tractor reservoir pressure reaches approximately 50 p. s. i. and to exhaust the port 132 and chamber 114 when the tractor reservoir pressure drops to approximately 35 p. s. i. With such an arrangement, venting of the trailer emergency line to atmosphere to cause an emergency application of the brakes whenever the tractor reservoir pressure drops to approximately 35 p. s. i. is assured, irrespective of the rate of leakage in the system.

From the above, it will be readily seen that the protection valve of the present invention provides advantages not heretofore present in valves of this general type. For example, the construction is such that the trailer emergency line is exhausted prior to the exhausting of the trailer service line, thus ensuring prompt emergency braking in the event of severe leakage. The valve is moreover, positively acting through the snap acting feature which is provided. In addition to the above, the valve traps air pressure of a predetermined value in the tractor braking system, when the valve moves to the emergency position, thus providing supplemental braking if desired. Further, the valve does not interfere in any way whatsoever, with the normal conventional braking operations.

In the claims appended the terms "trailer emergency" or "trailer service lines" will refer to all lines for such use on the trailer side of the protection valve regardless of whether the lines are connected to tractor or trailer carried devices. "Tractor service" and "emergency lines" will refer to all such lines on the opposite side of the protection valve.

While one embodiment of the invention has been shown and described herein, it will be readily apparent that various modifications may be resorted to without departing from the scope and spirit of the accompanying claims.

What is claimed is:

1. In a tractor trailer braking system having fluid pressure operated brakes on the tractor, fluid pressure operated brakes on the trailer, interconnected tractor and trailer service and emergency lines, means including a source of fluid pressure on the tractor for supplying fluid pressure to said interconnected lines to apply the tractor and trailer brakes in service upon an increase in pressure in said interconnected service lines and to apply the trailer brakes in emergency upon a reduction in pressure in the trailer emergency line, valve means for controlling communication through said tractor and trailer emergency lines, other valve means for controlling communication through said tractor and trailer service lines, and means including a single pressure responsive element movable in one direction in response to a first predetermined pressure at said source for opening both said valve means, and movable in the opposite direction in response to a second predetermined pressure at said source, less than said first pressure, for closing first said first valve means and then said other valve means, and means controlled by movement of said element in said opposite direction for connecting the trailer emergency line to atmosphere.

2. In a tractor trailer braking system having fluid pressure operated brakes on the tractor, fluid pressure operated brakes on the trailer, interconnected tractor and trailer service and emergency lines, means including a source of fluid pressure on the tractor for supplying fluid pressure to said interconnected lines to apply the tractor and trailer brakes in service upon an increase in pressure in said interconnected service lines and to apply the trailer brakes in emergency upon a reduction in pressure in the trailer emergency line, valve means for controlling communication through said tractor and trailer emergency lines, other valve means for controlling communication through said tractor and trailer service lines, and means including a single pressure responsive element movable in one direction in response to a first predetermined pressure at said source for opening both said valve means, and movable in the opposite direction in response to a second predetermined pressure at said source, less than said first pressure, for closing first said first valve means and then said other valve means, and means controlled by movement of said element in said opposite direction for connecting the trailer emergency line and the trailer service line to atmosphere.

3. In a tractor trailer braking system having fluid pressure operated brakes on the tractor, fluid pressure operated brakes on the trailer, interconnected tractor and trailer service and emergency lines, means including a source of fluid pressure on the tractor for supplying fluid pressure to said interconnected lines to apply the tractor and trailer brakes in service upon an increase in pressure in said interconnected service lines and to apply the trailer brakes in emergency upon a reduction in pressure in the trailer emergency line, an emergency valve controlling communication through said interconnected emergency lines, a spring for closing said emergency valve in the direction of fluid flow, a service valve controlling communication through said interconnected service lines, a spring for closing said service valve in the direction of fluid flow, and means including a single pressure responsive element movable in one direction in response to a first predetermined pressure at said source for opening both said emergency and service valves and movable in the opposite direction in response to a second predetermined pressure at said source, less than said first pressure, for allowing both of said valves to close in response to the action of their respective springs, and means controlled by movement of said element for preventing said service valve from closing until said emergency valve has closed, and other means controlled by movement of said element in said opposite direction for connecting the trailer emergency line to atmosphere.

4. In a tractor trailer braking system having fluid pressure operated brakes on the tractor, fluid pressure operated brakes on the trailer, interconnected tractor and trailer service and emergency lines, means including a source of fluid pressure on the tractor for supplying fluid pressure to said interconnected lines to apply the tractor and trailer brakes in service upon an increase in pressure in said interconnected service lines and to apply the trailer brakes in emergency upon a reduction in pressure in the trailer emergency line, an emergency valve controlling communication through said interconnected emergency lines, a spring for closing said emergency valve in the direction of fluid flow, a service valve controlling communication through said interconnected service lines, a spring for closing said service valve in the direction of fluid flow, and means including a single pressure responsive element movable in one direction in response to a first predetermined pressure at said source for opening both said emergency and service valves and movable in the opposite direction in response to a second predetermined pressure at said source, less than said first pressure, for allowing both of said valves to close in response to the action of their respective springs, and means controlled by movement of said element for preventing said service valve from closing until said emergency valve has closed, and other means controlled by movement of said element in said opposite direction for connecting the trailer emergency line to atmosphere after the emergency valve has closed but before the service valve has closed.

5. For use in a fluid pressure operated tractor-trailer braking system of the type having interconnected tractor and trailer service and emergency lines and a reservoir of fluid pressure on the tractor for charging said lines and wherein the tractor-trailer brakes are applied upon an increase in fluid pressure in the interconnected tractor and trailer service lines and the trailer brakes are applied upon a decrease in fluid pressure in the trailer emergency line, valve means for controlling communication through said lines comprising a casing provided with a pair of axially aligned service and emergency inlet chambers respectively connected with the tractor service and emergency lines, service and emergency outlet ports respectively connected with the trailer service and emergency lines, a service valve within said service inlet chamber, a spring acting to normally close said service valve to close communication from said service inlet chamber to the service outlet port, an emergency valve within said emergency inlet chamber, a spring acting to normally close said emergency valve to close communication from said emergency inlet chamber to the emergency outlet port, a diaphragm movable axially towards or away from said valves, an element movable by said diaphragm and engageable with said service valve to open the same upon movement of said diaphragm theretowards, a second element carried by said service valve and engageable with said emergency valve to open the same upon movement of said service valve theretowards, said second element when said valves are in closed position being spaced from said emergency valve so that said service valve opens before said emergency valve when said elements are moved in a valve opening direction and said emergency valve closes before said service valve when said elements are moved in the opposite direction.

6. Valve means as set forth in claim 5 which includes in addition, means cooperating with said second element to connect said emergency outlet port with atmosphere when said valves move in said opposite direction and before said service valve has moved to closed position.

7. In a tractor-trailer braking system having fluid pressure operated brakes on the tractor, fluid pressure operated brakes on the trailer, interconnected tractor and trailer service and emergency lines, means including a source of fluid pressure on the tractor for supplying fluid pressure to said interconnected lines to apply the tractor and trailer brakes in service upon an increase in pressure in said interconnected service lines and to apply the trailer brakes in emergency upon a reduction in pressure in the trailer emergency line, valve means for controlling communication through said lines comprising a casing provided with axially aligned emergency inlet, service inlet and exhaust chambers, said emergency inlet and service inlet chambers being respectively connected with the tractor emergency and service lines, and said exhaust chamber communicating with atmosphere, emergency and service outlet ports respectively connected with the trailer emergency and service lines, an emergency valve within said emergency inlet chamber, a spring acting to normally close said emergency valve to close communication from said emergency inlet chamber to the emergency outlet port, a service valve within said service inlet chamber, a spring acting to normally close said service valve to close communication from said service inlet chamber to the service outlet port, a diaphragm movable axially towards or away from said valves, a hollow tubular element operatively connected with the diaphragm and normally positioned to connect the service outlet port and exhaust chamber and engageable with said service valve to open the same upon movement of said diaphragm and tubular element theretowards, a second hollow tubular element connected with said service valve and engageable with said emergency valve to open the same upon movement of said service valve theretowards, said second tubular element when said valves are in closed position being spaced from said emergency valve so that said service valve opens before said emergency valve when said tubular elements are moved in a valve opening direction and said emergency valve closes and said emergency outlet port is connected with said exhaust chamber through said tubular elements before said service valve closes when said tubular elements are moved in the opposite direction.

References Cited in the file of this patent

UNITED STATES PATENTS

| | | |
|---|---|---|
| 2,645,307 | Stegman | July 14, 1953 |
| 2,645,308 | Fitch et al. | July 14, 1953 |
| 2,700,435 | Seale | Jan. 25, 1955 |